United States Patent
Kumar et al.

(10) Patent No.: US 12,222,925 B1
(45) Date of Patent: Feb. 11, 2025

(54) SYSTEMS AND METHODS FOR ENSURING QUALITY OF SEARCH SYSTEM DATA

(71) Applicant: Stripe, Inc., San Francisco, CA (US)

(72) Inventors: Ritesh Kumar, Seattle, WA (US); Priyanka Raju, Seattle, WA (US)

(73) Assignee: Stripe, Inc., San Francisco, CA (US)

( * ) Notice: Subject to any disclaimer, the term of this patent is extended or adjusted under 35 U.S.C. 154(b) by 32 days.

(21) Appl. No.: 17/330,019

(22) Filed: May 25, 2021

(51) Int. Cl.
*G06F 16/23* (2019.01)
*G06F 16/951* (2019.01)
*G06Q 30/06* (2023.01)

(52) U.S. Cl.
CPC ...... *G06F 16/2365* (2019.01); *G06F 16/2379* (2019.01); *G06F 16/951* (2019.01); *G06Q 30/06* (2013.01)

(58) Field of Classification Search
None
See application file for complete search history.

(56) References Cited

U.S. PATENT DOCUMENTS

| | | | |
|---|---|---|---|
| 7,653,665 B1 | 1/2010 | Stefani et al. | |
| 8,370,303 B1 | 2/2013 | Ceschim et al. | |
| 10,108,496 B2 | 10/2018 | Hoobler, III et al. | |
| 10,983,951 B1* | 4/2021 | Kuang | G06F 16/128 |
| 2013/0080200 A1* | 3/2013 | Connolly | G06Q 10/08 705/7.12 |
| 2014/0297535 A1* | 10/2014 | Pinsker | G06Q 10/103 705/342 |
| 2015/0026050 A1* | 1/2015 | Mathews | H04W 4/80 705/41 |
| 2015/0052108 A1 | 2/2015 | Volk et al. | |
| 2019/0324860 A1 | 10/2019 | Ngo | |
| 2020/0175003 A1* | 6/2020 | Jiang | G06Q 20/027 |
| 2020/0250046 A1* | 8/2020 | Wong | G06F 11/0709 |

(Continued)

OTHER PUBLICATIONS

Kunitskiy, Dmitriy "Fast Order Search Using Yelp's Data Pipeline and Elasticsearch," Jun. 1, 2018. http://engineeringblog.yelp.com/2018/06/fast-order-search.html.

(Continued)

*Primary Examiner* — Kris E Mackes
*Assistant Examiner* — Soheila (Gina) Davanlou
(74) *Attorney, Agent, or Firm* — Foley & Lardner LLP

(57) ABSTRACT

A method and apparatus for verifying integrity of search system data is described. The method may include accessing a first and second snapshot of search system data, the search system data in each snapshot including transaction data generated by a commerce platform system in response to transactions performed by the commerce platform system. The method may also include accessing an operation log of operations performed on the transaction data during a time between when the first snapshot was generated and a time when the second snapshot was generated. Furthermore, the method may include transforming the transaction data from the first snapshot based on the operations in the operation log to generate validated transaction data in a validated second snapshot, and determining a reliability of the transaction data at the second time period based on a comparison of transaction data from the second snapshot with the validated transaction data from the validated second snapshot.

19 Claims, 5 Drawing Sheets

(56) References Cited

U.S. PATENT DOCUMENTS

2020/0364201 A1* 11/2020 Cseri ............... G06F 16/219
2021/0165840 A1* 6/2021 Kotla ............... G06F 16/2228

OTHER PUBLICATIONS

International Preliminary Report on Patentability received for PCT Patent Application No. PCT/US2022/30756, mailed on Dec. 7, 2023, 6 pages.
International Search Report and Written Opinion received for PCT Patent Application No. PCT/US2022/30756, mailed on Sep. 7, 2022, 7 pages.

* cited by examiner

SYSTEMS AND METHODS FOR ENSURING QUALITY OF SEARCH SYSTEM DATA

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc. Consumers therefore often engage, purchase, rent, etc. services and/or products of the merchant or the merchant's agent via a merchant interface, such as a merchant web page, application, or other interface.

These merchants, although providing systems for supplying products and/or services to consumers via their interface, often do not perform the financial processing associated with the merchant transactions. Instead, merchants utilize commerce systems to process financial transactions for the products and/or services provided to consumers. Commerce systems may provide their transaction processing services to the merchant by way of software applications, web pages, application programming interfaces (APIs), etc. The merchant system integrates the commerce system software, APIs, web pages, etc. into the merchant interfaces to handle the processing of consumer transactions. Once integrated, the commerce system, on behalf of the merchant system, can perform processing of payments for goods or services including collecting credit card information, running credit cards, crediting a merchant account for the transaction, crediting agents responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of the merchant.

Often, such merchants will seek to access records of the various transactions processed by the commerce system. Based on the records that the merchants seek to access, they employ search services provided by the commerce system, such as structured queries transmitted via an API interface, search queries entered into search bars in user interfaces provide by the commerce system (e.g., web based search), or via other interfaces provided by the commerce platform in which a merchant can submit search queries. The merchants trust that the search is executed against a trustworthy set of data. That is, the search is executed against a true, faithful, and up-to-date set of data so that the returned result is also true and trustworthy.

However, commerce systems typically handle a vast number of transactions each minute, hour, day, etc. Although some search systems provide for real time document ingestion, storage, and indexing, the corpus of data may not represent an accurate state of transactions processed by the commerce system for the merchants. For example, there may be cases in which a document representing a transaction (e.g., purchase, refund, deletion, etc.) is not properly ingested by the search system, there is a as communication failure between the commerce system and search system, messages to transmit new data for ingestion are rejected by the search system, timing problems such as indexing lag resulting in temporary inconsistencies, there may be error(s) or inaccuracie(s) in document/date sent to the search system, or other errors resulting in one or more documents being inaccurately ingested, stored, and indexed or failing to be ingested, stored and indexed.

Merchant systems, however, assume that the data they search against, especially in the field of financial accounting for transactions, is accurate. If such data is not accurate, then the merchant will lack faith in returned search results, cannot rely on the results (e.g., for accounting, other bookkeeping purposes, legal reporting requirements, etc.), and otherwise fail to trust in the search and/or commerce system. Therefore, a technical challenge exists in providing and ensuring data quality in search system data to ensure trustworthy and faithful search.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
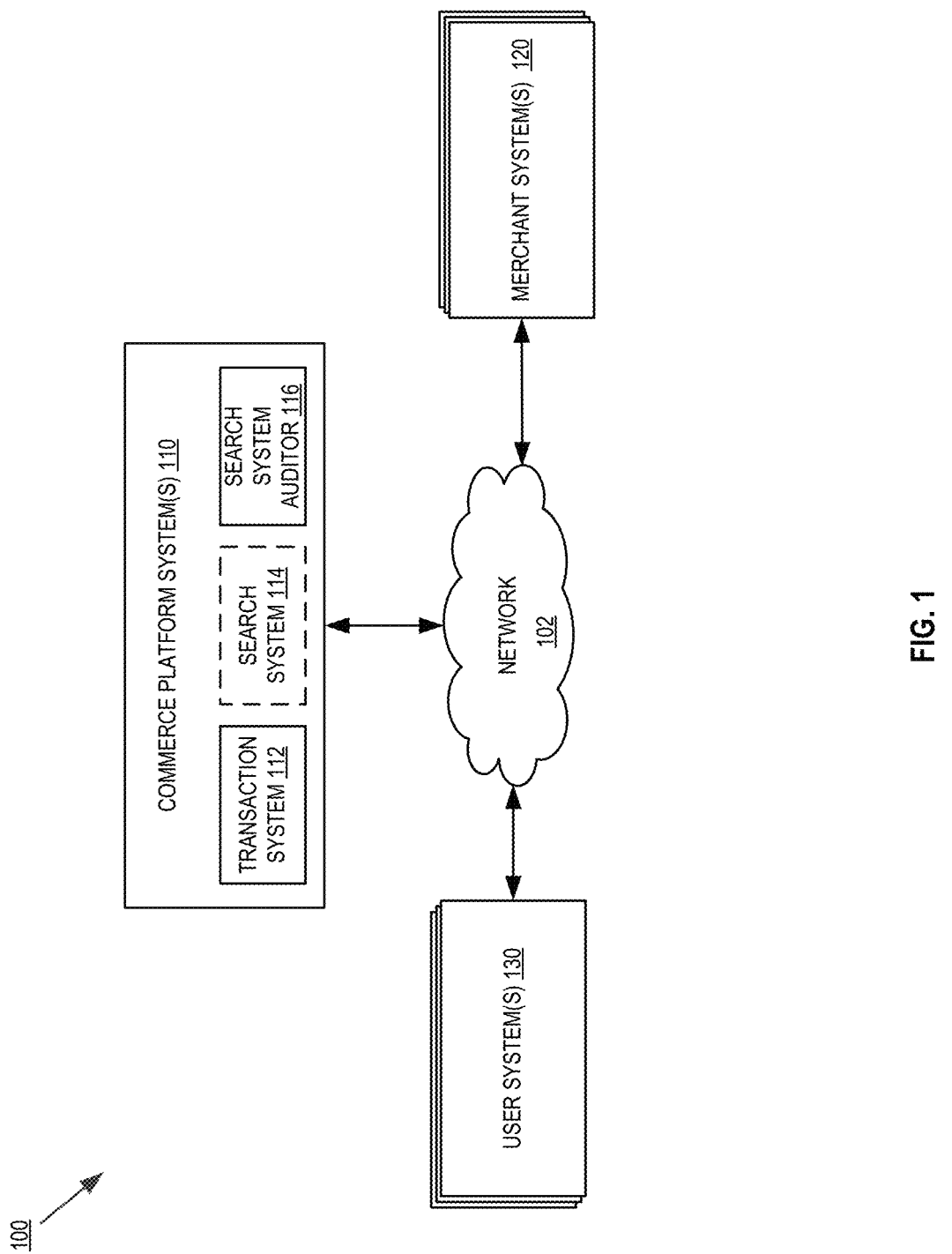
FIG. 1 is a block diagram of an exemplary system architecture for auditing search system data by a commerce platform system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "accessing", "transforming", "determining", "validating", "tracing", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for auditing search system data by a commerce platform system. In one embodiment, the system 100 includes commerce platform system(s) 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The commerce platform system(s) 110 and merchant system(s) 120 may also be one or more computing devices, such as one or more server computer systems, desktop computer systems, etc.

The embodiments discussed herein may be utilized by a plurality of different types of systems, such as other commerce platform system(s) including payment processing systems, card authorization systems, banks, and other systems providing search features to its customers. Furthermore, any other type of system seeking to ensure search data quality may employ the techniques discussed herein. However, to avoid obscuring the embodiments discussed herein, a commerce platform system providing network based commercial transactions and search of such transactions is discussed to illustrate and describe the embodiments of the present invention, and is not intended to limit the application of the techniques described herein from applicability to other systems.

The commerce platform system(s) 110, merchant system(s) 120, and merchant user system(s) 130 may be coupled to a network 102 and communicate with one another using any of the standard protocols for the exchange of information, including secure communication protocols. In one embodiment, one or more of the commerce platform system(s) 110, merchant system(s) 120, and user system(s) 130 may run on one Local Area Network (LAN) and may be incorporated into the same physical or logical system, or different physical or logical systems. Alternatively, the commerce platform system(s) 110, merchant system(s) 120, and merchant system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions initiated at user system(s) 130 performed on behalf of a merchant system 120, clear transactions, performing payouts to merchant and/or merchant agents, manage merchant and/or agent accounts held at the commerce platform system(s) 110, as well as other services typically associated with commerce platforms systems such as, for example, STRIPE™. Each of these transactions is processed by the transaction system 112 of commerce platform system(s) 110, and data associated with the transaction is stored in a data store of the commerce platform system (not shown). That is, the commerce platform system(s) keeps a record of the transactions, the details of the transaction, and unique identifiers generated by the transaction system 112 for each individual transaction.

In embodiments, the transaction system 112, or another subsystem of commerce platform systems(s) 110 (not shown), provides transaction data to the search system 114. The search system, 114 in embodiments is a real-time distributed search system, such as ELASTICSEARCH™, SOLR™, as well as other search systems. The search system 114 is illustrated in dashed line because in embodiments, the search system is executed at server computer systems of the commerce platform system(s) 110. However, in embodiments, search system 114 may be a remotely hosted search system by a third party, such as the developer and distributor of the search system, a cloud storage and computing system provider executing and/or hosting the search system, third party systems providing full or partially managed implementations of the search system, etc. In either embodiment, the transaction data provided by transaction system 112 to search system 114, which may represent a transaction record, a transformed transaction record, etc. and include data associated with the transaction (e.g., transaction type, transaction parties, one or more identifiers for the transaction, merchant system identifiers, user identifiers, unique internal commerce platform system identifiers, etc.) is provided to the search system 114. The search system is responsible for ingesting the transaction data for purposes of indexing and storing the transaction data for search purposes, as discussed in greater detail herein. Furthermore, additional types of documents or data may be provided to the search system for search purposes (e.g., support documentation, other types of merchant records, tax information documents, etc.).

Furthermore, in embodiments, commerce platform system 110 may provide an interface to merchant system(s) 120 and/or user system(s) 130 to search the transaction data using the search services of search system 114. For example, commerce platform system 110 may provide web based graphical user interfaces (e.g., client management portals) with search features such as search bars enabling natural language and/or structured queries of a merchant's or user's transaction data. Other interfaces, such as application programming interfaces (API) may expose search features of the commerce platform system 110 to the merchant system(s) 120 and/or user system(s) 130 to enable communication of search queries via communication with API endpoints of the commerce platform system(s) 110.

However, due to indexing lag at search system 114 given the potential scale and number of transactions performed by commerce platform system 110, transaction data provided to the search system 114 that does not match actual transaction data, missed entries (e.g., missed create, update, delete, or other entries) impacting the corpus of transaction data, as well as other sources of potential data inconsistencies, the transaction data indexed, stored, and made searchable by the search system 114 may therefore be inconsistent with the actual state of transaction data maintained by the commerce platform system 110. When such an inconsistency results, merchant system(s) 120 and/or user system(s) 130 may obtain inaccurate search results leading to a loss in confidence in the data quality of the search. Further, when inaccurate results are relied upon and/or used by the merchant system(s) 120 and/or user system(s) 130, such may lead to errors (e.g. accounting, mandated reporting, etc.) at the merchant system(s) 120 and/or user system(s) 130. Therefore, approaches to ensuring and validating data quality of search system data are provided by the commerce platform system(s) 110.

In embodiments, commerce platform system(s) 110 further includes a search system auditor 116. The search system auditor 116, as will be discussed in greater detail below, validates the data quality of search system data by accessing snapshots of search system data and operation logs maintained by the transaction system 112 for each transaction performed. The snapshots are a state of search system data captured and stored for a point in time. The snapshots may be generated by search system 114 on a periodic basis, and stored at the search system 114, transaction system 112, or other storage of the commerce platform system(s) 110. In embodiments, each snapshot may be a snapshot of the corpus of search system data, an index, as well as other search system data at the time of the snapshot.

Furthermore, the operation logs maintained by the transaction system 112 store data, such as type of transaction, transaction identifiers, amounts, merchant identifiers, customer identifiers, timestamps of transaction initiation and completion, unique internal commerce platform system identifiers, references to other transactions (e.g., for refunds, reversals, etc.), as well as other data and metadata that describes and identifiers relevant transaction details. In embodiments, the transaction logs are an append-only transaction log that stores records for each transaction.

As will be discussed in greater detail below, search system auditor 116 accesses a snapshot at an initial, first time period, where the snapshot at the first time period is a trusted snapshot (e.g., due to prior validation). A subsequent, second snapshot is of unknown validity status such that the reliability of data within the snapshot is unknown. However, in embodiments, search system auditor 116 locates the operations performed by the transaction system 112 in the append-only operation log that occurred during the time from the first snapshot to the second snapshot, and builds a trusted and validated second snapshot. That is, the operation log data (accurately representing each transaction) may be fed to the search system 114 to build a validated second search system data snapshot from the first (validated) snapshot. For example, the operations from the append-only operation log may be fed to the search system 114 to regenerate one or more index(es), search system data, log files, etc. a synchronously with other search system processes. Search system auditor 116 may then compare the index(es), data, log files, etc. from the validated second snapshot (e.g., generated from the first snapshot and the operation log) with the actual second snapshot to determine if the data within the two match. When a match is found, the actual second snapshot can be validated as being accurate of the actual state of transaction data of the commerce platform system 110, and searches performed on data up to the time period when the second snapshot was generated as being accurate.

When inconsistencies are found, search system auditor may locate the sources of inconsistencies by tracing inconsistent index, search corpus, logs, etc. based on identifiers. That is, the transaction, commerce platform, and other identifiers maintained for each transaction may be used to trace the transaction within the search system data (e.g., the generated index(es), stored transaction data that has been indexed for search purposes, etc.). Then, in embodiments, the search system data may be corrected and/or regenerated so that the search system data is updated to an accurate state for future searches.

In embodiments, search system auditor 116 performs data quality verification on a periodic basis (e.g., hourly, after N hours, daily, after a certain number of transactions, etc.) to ensure data quality for merchants and/or users seeking to perform search.

Figure 2:
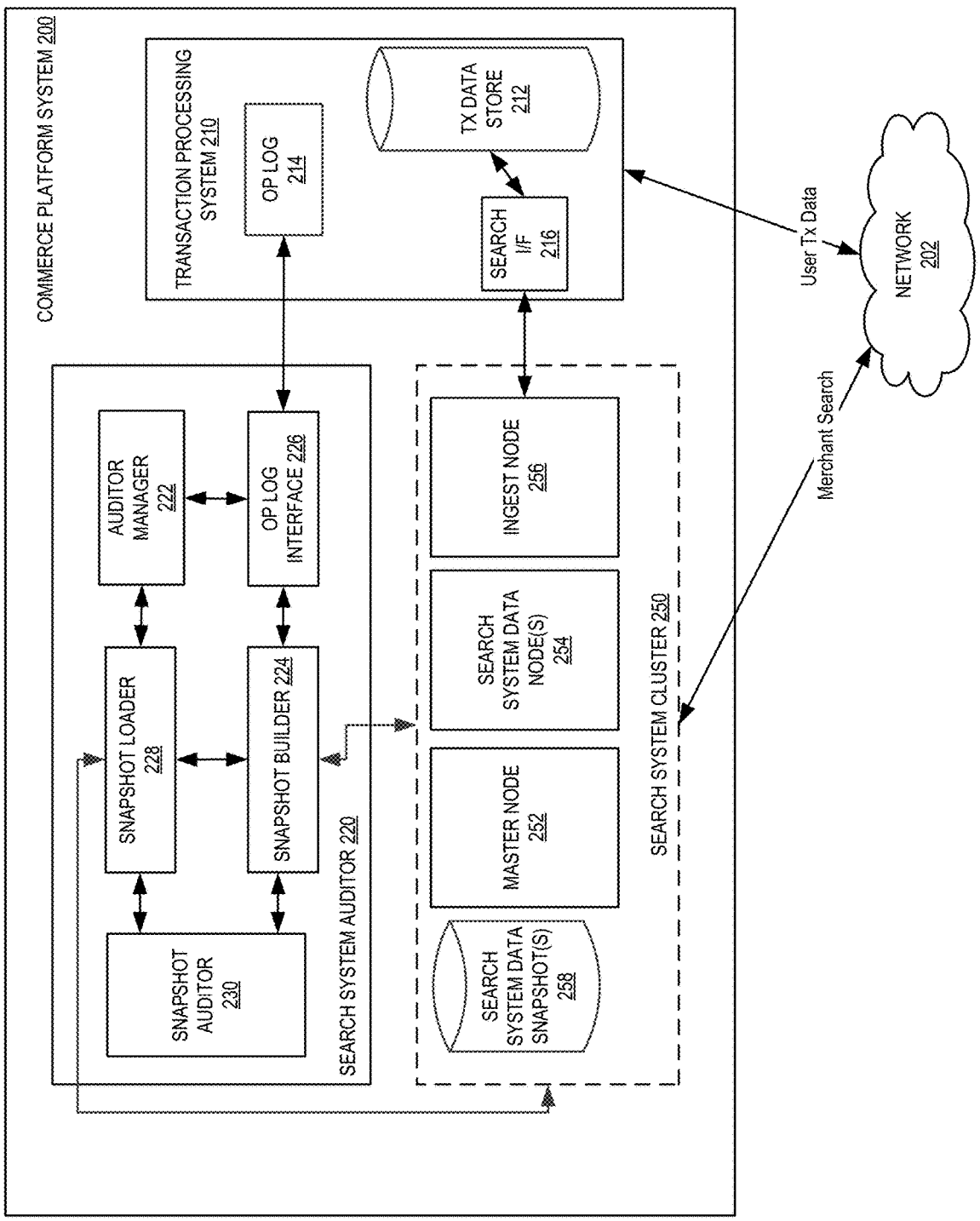
FIG. 2 is a block diagram of one embodiment of a commerce platform system for performing search system data auditing.

FIG. 2 is a block diagram of one embodiment of a commerce platform system 200 for performing search system data auditing. Commerce platform 200 provides additional details for the commerce platform system(s) 110 discussed above in FIG. 1.

In one embodiment, commerce platform 200 includes a transaction processing system 210 and a search system auditor 220. In embodiments, commerce platform system 200 further includes a search system cluster 250. However, in embodiments, the search system cluster 250 may be maintained at a remote system from the commerce platform system, and accessed by the commerce platform system using one or more APIs of a search system provider, such as those provided by ELASTICSEARCH™, SOLR™, or other search system.

In embodiments, transaction processing system 210 is responsible for receiving and processing transactions originating from merchant system(s) (not shown) and user system(s) (not shown) over network 202. For example, the transactions may be financial transactions performed by payments systems including, but not limited to, purchases, refunds, credit requests, subscriptions, etc. Transaction processing system 210 maintains a transaction data store 212 for each merchant and/or user which uses the services of the commerce platform system 210. The data store may include financial books providing account balances, records of transactions, account status, etc. Furthermore, transaction processing system 210 maintains the append-only operation (op) log 214 of each transaction that has been processed. It should be noted that some transactions, such as deletions, reversals, etc. may change, remove, add, or otherwise change the data within transaction data store. The op log 214 therefore provides a record of each operation even when such operation is not visible as a standalone operation within the transaction data store 212.

In embodiments, transaction processing system 210 includes a search system interface 216 that executes one or more search system APIs to communicate transactions from the transaction data store 212 to the ingest node of the search system cluster 250. The transaction data may be transformed by the search interface 216 prior to communication, such as extracting a subset of data, formatting the data, constructing an API based message, etc. to communicate the transaction data (e.g., identifiers, details, metadata, etc.) to the search system cluster.

Search system cluster 250, as discussed herein, is an implementation of a search system enabling search of transaction data of the commerce platform system 200. In embodiments, search system cluster is an ELASTICSEARCH™ cluster, SOLR™ cluster, or other search system cluster that performs distributed data storage and indexing in real-time or near real-time a transaction data is received. That is, search system cluster provides for document (e.g., transaction data) ingestion, and distribution of the transaction data and indexes among nodes within the cluster. The index maintained by the search system cluster 250 supports structure and natural language searches across the distributed documents and indexes.

Search system cluster 250 includes several nodes that may be distributed among computing systems. The nodes include a master node 252 that is responsible for cluster-wide management and configuration (e.g., adding and deleting nodes, configuring backups, replication, etc.), search system data node(s) 254 that are responsible for storing data (e.g., searchable transaction data, index shards,) and executing data related operations such as performing structured or unstructured searches, indexing, aggregating data, etc., and ingest node 256 which is responsible for pre-processing received transaction data from the interface 216 before indexing. Thus, the distributed nodes of search system cluster 250 provide for a fully functional distributed search system enabling commerce platform system's 200 users to search their relevant transaction data.

Search system cluster 250 further includes search system data snapshot(s) 258. In embodiments, the snapshots may be maintained within the cluster 250. However, the snapshots may also be stored remotely at the commerce platform system 200, a cloud storage provider, or other storage location accessible to the search system cluster 250 and search system auditor 220. Search system data snapshot(s) 258 is a data store that stores a state of search system data at various points of time, such as hourly, every 12 hours, daily, etc. The snapshots may include just underlying searchable data (e.g., transaction data), but may also include search indexes, etc. Furthermore, given the distributed nature of the search system cluster's data node(s) 254, in embodiments, the snapshots join the data into a single piece of data.

In embodiments, search system auditor 220 accesses the search system data snapshot(s) 258 data store to validate data quality of search system data. In embodiments, auditor manager 222 is responsible for periodically instructing snapshot loader 228 to access snapshots from data store 258. The snapshots may be for a first time period (e.g., a validated snapshot that was previously validated as accurate) and for a second time period (e.g., a snapshot generated at a time after the validated snapshot). Auditor manager further instructs op log interface 226 to access operations in op log 214 that were performed by transaction processing system 210 from the first time period to the second time period.

Search system auditor further includes snapshot builder 224, which is responsible for using the operations obtained by op log interface 226 from op log 214 and the first snapshot to rebuild the second snapshot. In embodiments, snapshot builder may employ the services of search system cluster 250 by feeding the operations and data from the op log to search system cluster to enable the ingest node 256 and/or search system data node(s) 254 to update the first snapshot based on the operations from the op log. That is, snapshot builder uses search system cluster 250 to build a trusted and validated version of the second snapshot. Because the op log is an append-only operations log of the transaction processing system 210 that stores a record of every operation impacting a transaction record within transaction data store 212, the operations accessed by op log interface, including the data behind the operations, identifiers, type of operation performed, etc. will represent the totality of operations performed and represented by the data within transaction data store 212. Thus, the building of a validated snapshot for the second time period (e.g., F (Snapshot$_{T1}$, {op log operations$_{T1 \ldots T2}$})=Validated Snapshot S$_{T2}$') creates a truthful version of what the second snapshot should contain.

Snapshot auditor 230 of the search system auditor 220 then uses the validated snapshot (e.g., S$_{T2}$') to compare against the second snapshot at the second time period (e.g., S$_{T2}$). In embodiments, snapshot auditor 230 performs a comparison of the constituent data within the snapshots to detect when records differ from one another. When the snapshots match, a data quality status of the second snapshot can be updated to reflect that it has been validated as being accurate. However, when there are inconsistent entries located, in embodiments, the entries may be traced via one or more identifiers within the entries (e.g. transaction with identifier 1234567 having amount $x in validated S$_{T2}$' can be traced to transaction with identifier 1234567 having amount $y in S$_{T2}$). Then, based on corresponding identifiers associating the underlying data, snapshot auditor 230 may communicate and/or request a corresponding correction of the underlying information record at search system cluster 250. This may be repeated for each inconsistency so that the data within cluster 250 is updated and re-indexed so that the data reliability is ensured up to the second time period for merchant and/or user search of transaction data via commerce platform system 200.

Figure 3:
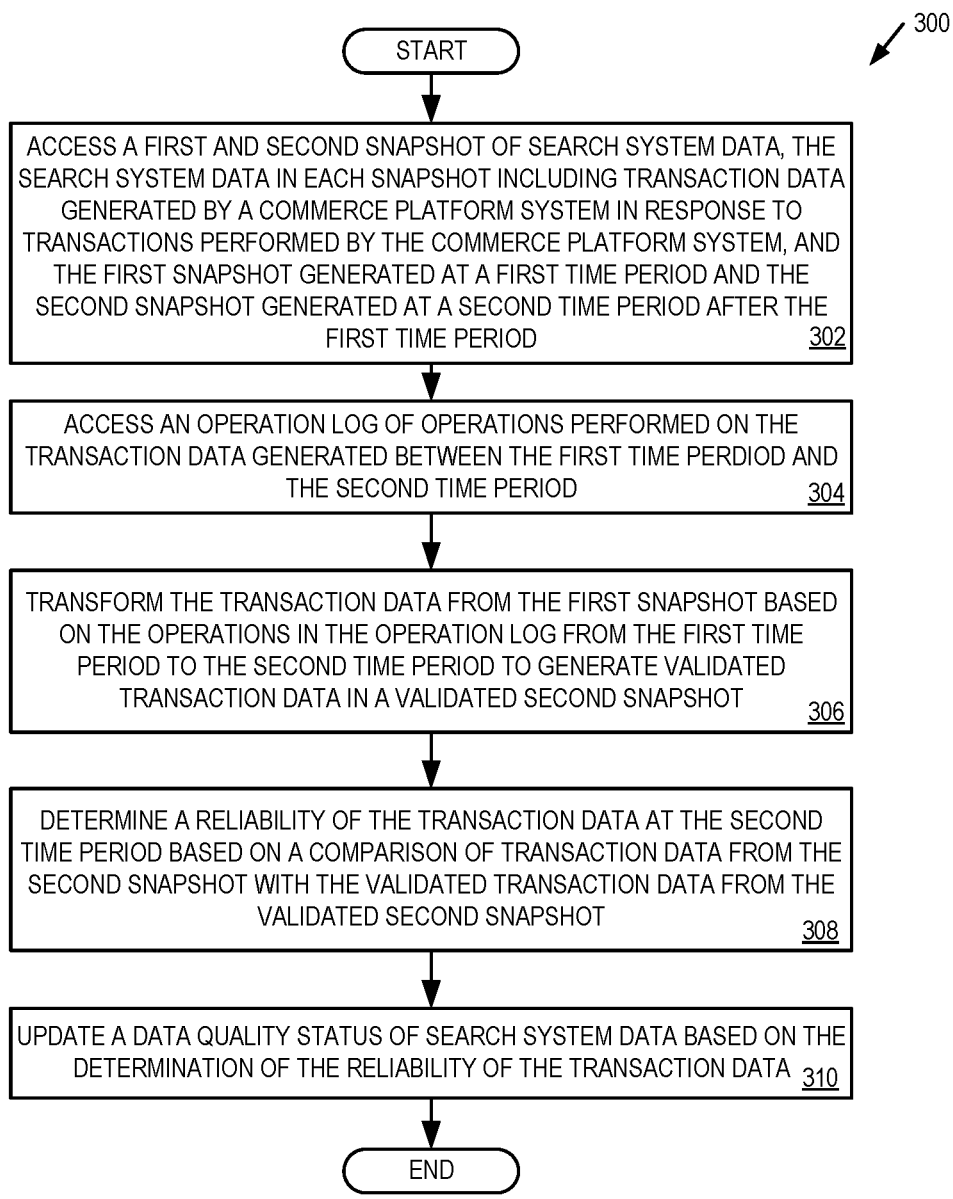
FIG. 3 is a flow diagram of one embodiment of a method for performing search system data auditing to detect a data quality status of search system data.

FIG. 3 is a flow diagram of one embodiment of a method 300 for performing search system data auditing to detect a data quality status of search system data. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g., commerce platform system 110 or commerce platform system 200).

Referring to FIG. 3, processing logic begins by accessing a first and second snapshot of search system data, the search system data in each snapshot including transaction data generated by a commerce platform system in response to transactions performed by the commerce platform system, and the first snapshot generated at a first time period and the second snapshot generated at a second time period after the first time period (processing block 302). As discussed herein, each snapshot stores and/or represents a state of the transaction data within a search system. Furthermore, in embodiments, the snapshot at the first time period is a validated/validated snapshot in which the data quality has been ensured. In other words, at the first time period, the snapshot and search system data were determined to be an accurate reflection of corresponding commerce platform system transaction data.

Processing logic further accesses an operation log of operations performed on the transaction data generated between the first time period and the second time period (processing block 304). As discussed herein, the operation log is an append-only op log of all transactions performed by a transaction processing system of a commerce platform.

Processing logic then transforms the transaction data from the first snapshot based on the operations in the operation log form the first time period to the second time period to generate validated transaction data in a validated second snapshot (processing block 306). In embodiments, a search system may be used to transform the data in the first snapshot to the validated second snapshot using the operations form the operation log. Furthermore, the operation log is a detailed log including type of transaction, identifiers, metadata, descriptors, amounts, etc. so that corresponding and accurate operations may be processed by processing logic when transforming the first snapshot to the second snapshot. In embodiments, only the underlying and searchable data (e.g., that distributed among search system nodes) is generated for the second, validated snapshot. However, in other embodiments, additional data, such as indexes, search system metadata, etc. may also be generated during the transformation.

Processing logic then determines a reliability of the transaction data at the second time period based on a comparison of transaction data from the second snapshot with the validated transaction data from the validated second snapshot (processing block 308). In embodiments, processing logic may perform a record-by-record, line by line, or other comparison to determine whether data within the second, validated snapshot and the actual second snapshot match. Based on the comparison, processing logic updates a data quality status of search system data based on the determination of the reliability of the transaction data (processing block 310). The data quality status is an indicator as to whether data quality is ensured up to the time period of validation. Furthermore, in embodiments, search may be limited to only a most recent time period which has a validated data quality status to ensure that any search performed is accurate and provides accurate results.

Figure 4:
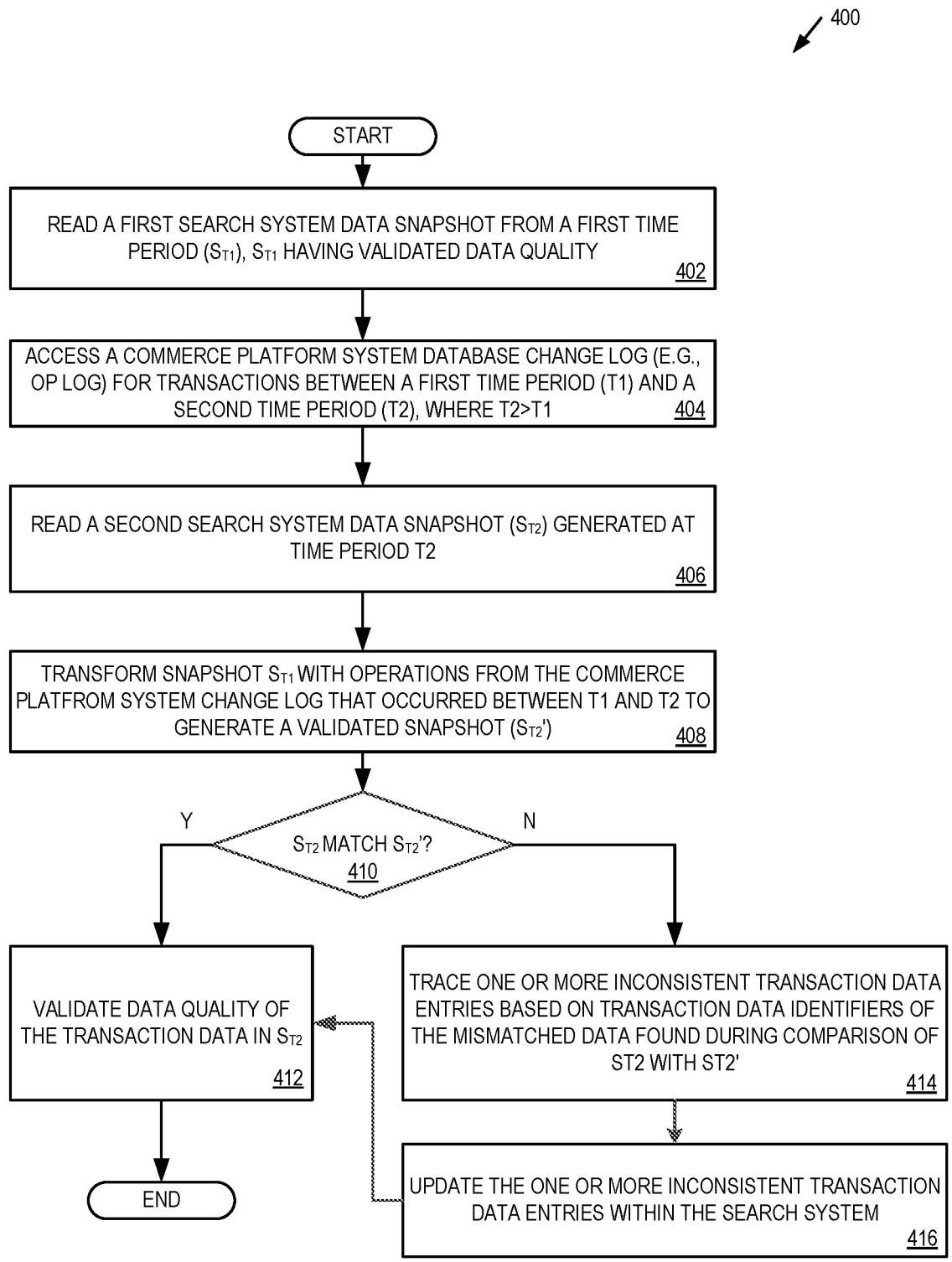
FIG. 4 is a flow diagram of one embodiment of a method for performing search system data auditing to validate data quality of search system data and remedy inconsistencies in the search system data when detected.

FIG. 4 is a flow diagram of one embodiment of a method 400 for performing search system data auditing to validate data quality of search system data and remedy inconsistencies in the search system data when detected. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or commerce platform system 200).

Referring to FIG. 4, processing logic begins by reading a first search system data snapshot from a first time period ($S_{T1}$), where $S_{T1}$ has a validated data quality (processing block 402). Processing logic may read the snapshot from a snapshot data store maintained by a commerce platform system, by a search system, at remote storage (e.g. a cloud system), or another storage. Furthermore, as discussed herein, each snapshot stores search system data, including underlying searchable transaction data, as well as additional optional search system data (e.g. indexes, metadata, etc.), that reflects a state of the search system data at the time period T1.

Processing logic accesses a commerce platform system database change log (e.g., an op log) for transactions between the first time period (T1) and a second time period (T2), where T2>T1 (processing block 404). The operations log stores data sufficient to recreate elements of each transaction processed by a commerce platform between T2 and T1, such as transaction type, parties to a transaction, identifiers, etc. Furthermore, these data elements in then op log correspond to at least the transaction elements fed into the search system which generated the snapshots.

Processing logic further reads a second search system data snapshot ($S_{T2}$) generated at the second time period (T2) (processing block 406). In embodiments, operations 402-406 may be performed in parallel within one another.

Processing logic then transforms the snapshot su with operations form the commerce platform system change log that occurred between T1 and T2 to generate a validated snapshot ($S_{T2}'$) (processing block 408). As discussed herein, the snapshot data may be transformed using the services of a search system, may be updated by locating entries based on identifier and making appropriate changes (e.g., updates, deletions, additions, etc.), or a combination thereof.

After the transformation is completed, processing logic determines whether $S_{T2}$ matches $S_{T2}'$ (processing block 410). In embodiments, processing logic may perform a per-item, per data record, per database line, etc. comparison to ensure that any data appearing within $S_{T2}$ matches the validated data in the transformed snapshot (e.g. $S_{T2}'=F(S_{T1}, \{\text{op log operations}_{T1 \ldots T2}\})$?).

When a match is determined, then processing logic performs a validation of a data quality of the transaction data in ST2 (processing block 412). By validating the data quality, the data is considered reliable at time period T2, and searches performed up to that time period are reliable. As a result, merchants and users performing searches may be ensured of reliability in their search results.

When a match cannot be determined (processing block 410), processing logic traces one or more inconsistent transaction data entries based on transaction data identifiers of the mismatched data found during comparison of $S_{T2}$ with $S_{T2}'$ (processing block 414). Since $S_{T2}'$ is considered an accurate and truthful representation of data that should occur in the second snapshot, data having a same identifier may be used to update the data within the search system (processing block 416). Once updated, subsequent search system operations, such as data distribution, redundancy operations, index building, etc. are also ensured to be accurate, therefore ensuring accurate search results.

Figure 5:
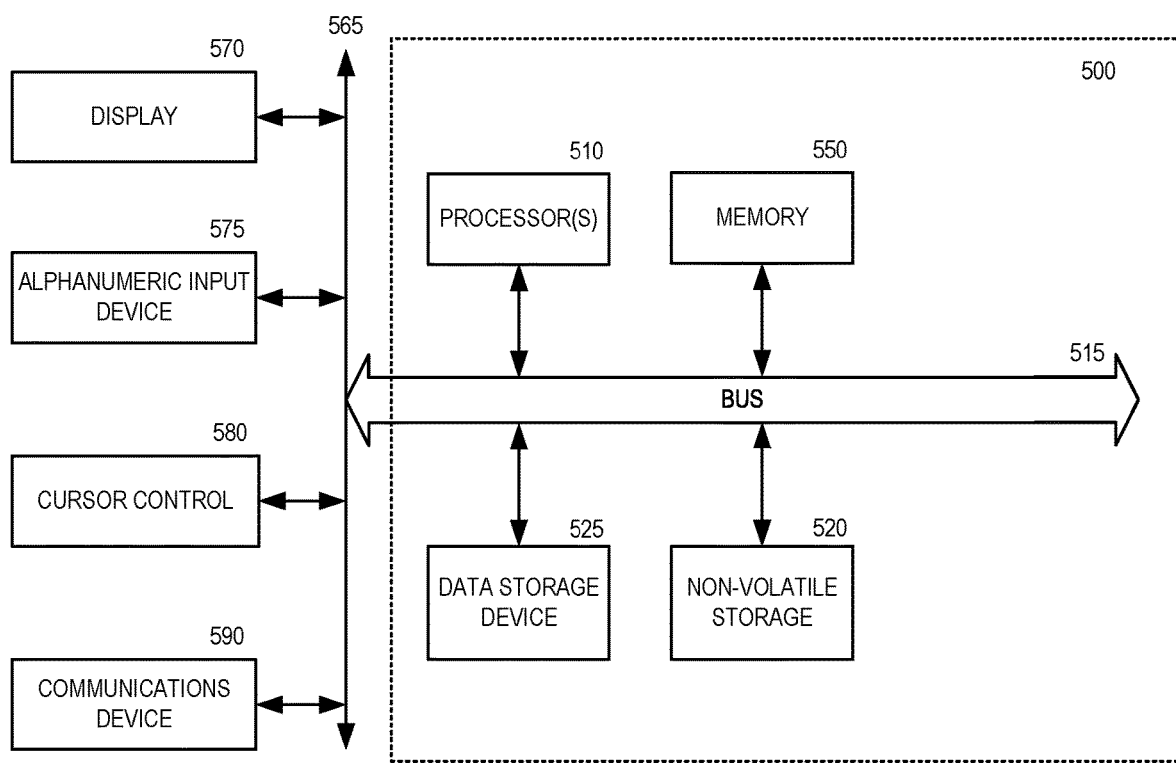
FIG. 5 is one embodiment of a computer system that may be used to support the systems and operations discussed herein.

FIG. 5 is one embodiment of a computer system that may be used to support the systems and operations discussed herein. For example, the computer system illustrated in FIG. 5 may be used by a commerce platform system, a merchant development system, merchant user system, etc. It will be apparent to those of ordinary skill in the art, however that other alternative systems of various system architectures may also be used.

The data processing system illustrated in FIG. 5 includes a bus or other internal communication means 515 for communicating information, and a processor 510 coupled to the bus 515 for processing information. The system further comprises a random access memory (RAM) or other volatile storage device 550 (referred to as memory), coupled to bus 515 for storing information and instructions to be executed by processor 510. Main memory 550 also may be used for storing temporary variables or other intermediate information during execution of instructions by processor 510. The system also comprises a read only memory (ROM) and/or static storage device 520 coupled to bus 515 for storing static information and instructions for processor 510, and a data storage device 525 such as a magnetic disk or optical disk and its corresponding disk drive. Data storage device 525 is coupled to bus 515 for storing information and instructions.

The system may further be coupled to a display device 570, such as a light emitting diode (LED) display or a liquid crystal display (LCD) coupled to bus 515 through bus 565 for displaying information to a computer user. An alphanumeric input device 575, including alphanumeric and other keys, may also be coupled to bus 515 through bus 565 for communicating information and command selections to processor 510. An additional user input device is cursor control device 580, such as a touchpad, mouse, a trackball, stylus, or cursor direction keys coupled to bus 515 through bus 565 for communicating direction information and command selections to processor 510, and for controlling cursor movement on display device 570.

Another device, which may optionally be coupled to computer system 500, is a communication device 590 for accessing other nodes of a distributed system via a network. The communication device 590 may include any of a number of commercially available networking peripheral devices such as those used for coupling to an Ethernet, token ring, Internet, or wide area network. The communication device 590 may further be a null-modem connection, or any other mechanism that provides connectivity between the computer system 500 and the outside world. Note that any or all of the components of this system illustrated in FIG. 5 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 550, mass storage device 525, or other storage medium locally or remotely accessible to processor 510.

It will be apparent to those of ordinary skill in the art that the system, method, and process described herein can be implemented as software stored in main memory 550 or read only memory 520 and executed by processor 510. This control logic or software may also be resident on an article of manufacture comprising a computer readable medium having computer readable program code embodied therein and being readable by the mass storage device 525 and for causing the processor 510 to operate in accordance with the methods and teachings herein.

The embodiments discussed herein may also be embodied in a handheld or portable device containing a subset of the computer hardware components described above. For example, the handheld device may be configured to contain only the bus 515, the processor 510, and memory 550 and/or 525. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 510, a data storage device 525, a bus 515, and memory 550, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for verifying integrity of search system data, the method comprising:

accessing, by a server computer system at a search system, a first snapshot and a second snapshot of the search system data, wherein the search system data in each snapshot comprises one or more search indexes and transformed data searchable by the one or more search indexes, and the search system data is generated for each snapshot from data ingested by the search system in response to one or more events performed by a commerce platform system, wherein the first snapshot is a validated snapshot for which a validation process has been performed ensuring reliability of data within the first snapshot, and the second snapshot is an unvalidated snapshot for which the validation process has not been performed;

accessing, by the server computer system at a processing system, an operation log of operations performed by the commerce platform system during a time period between when the first snapshot was generated and when the second snapshot was generated, the operation log including data to recreate each event of the one or more events processed by the commerce platform system during the time period between when the first snapshot was generated and when the second snapshot was generated;

transforming, by the server computer system, first one or more search indexes and first transformed data from first search system data from the first snapshot by ingestion of the operations in the operation log at the search system and updating the first one or more search indexes and the first transformed data from the first search system data with the ingested operations in the operation log to generate a validated second search system data in a validated second snapshot;

determining, by the server computer system, a reliability of second search system data within the second snapshot by comparing the second search system data from the second snapshot with the validated second search system data from the validated second snapshot; and in response to determining that the reliability does not indicate a match between the second search system data from the second snapshot and the validated second search system data from the validated second snapshot:

updating, by the server computer system, a data quality status of the second search system data from the second snapshot indicating that data quality of the second search system data from the second snapshot is not validated up to a time when the second snapshot was generated;

tracing, by the server computer system, an inconsistent search system data entry in the second search system data from the second snapshot based on a first data identifier of a mismatched search system data entry found during comparison of the inconsistent search system data entry in the second snapshot with a corresponding validated search system data entry from the validated second snapshot having a second data identifier that is identical to the first data identifier, wherein the first data identifier and the second data identifier are used within the search system;

requesting, by the server computer system, a correction of the mismatched search system data entry in the search system data that corresponds to the inconsistent search system data entry in the second search system data;

updating and re-indexing, by the server computer system, the mismatched search system data entry in the second search system data by replacing the mismatched search system data entry with the validated search system data entry;

in response to updating and re-indexing the mismatched search system data entry, updating, by the server computer system, the data quality status of the second search system data from the second snapshot indicating that the data quality of the second search system data from the second snapshot is validated up to the time when the second snapshot was generated; and limiting, by the server computer system, a search result up to the time when the second snapshot was generated based on the updated validated data quality.

2. The method of claim 1, further comprising:
in response to determining that the reliability indicates a match between the second search system data from the second snapshot and the validated second search system data from the validated second snapshot, validating the data quality status of the second search system data based on the determination of the reliability of the second search system data.

3. The method of claim 1, further comprising:
updating the inconsistent search system data entry in the second search system data from the second snapshot having the data identifier with a corresponding validated second search system data entry from the validated second snapshot having the same data identifier.

4. The method of claim 3, further comprising:
transforming the second snapshot to a validated data quality status by tracing and updating each of one or more inconsistent search system data entries found during comparison of the second search system data entries in the second snapshot with corresponding validated second search system data entries from the validated second snapshot.

5. The method of claim 1, wherein the first snapshot generated by the commerce platform system at a first time and the second snapshot generated by the commerce platform system at a second time after the first time.

6. The method of claim 1, wherein the search system data is generated by: ingesting original data generated by the commerce platform system, generating a search index from the original data, and storing a transformed version of the ingested original data in a format searchable using the search index.

7. The method of claim 6, wherein the ingesting, generating, and storing are performed by a search system executed by the commerce platform system.

8. The method of claim 6, wherein the ingesting, generating, and storing are performed by a search system executed by a system remote to the commerce platform system.

9. The method of claim 1, wherein the search system data generated by the commerce platform system comprises data generated from data associated with one or more events performed by the commerce platform system on behalf of one or more merchant systems.

10. A non-transitory computer readable storage medium including instructions that, when executed by a processor, cause the processor to perform operations for verifying integrity of search system data, the operations comprising:

accessing a first snapshot and a second snapshot of search system data, wherein the search system data in each snapshot comprises one or more search indexes and transformed data searchable by the one or more search indexes, and the search system data is generated for each snapshot from data ingested by a search system in response to one or more events performed by a commerce platform system, wherein the first snapshot is a validated snapshot for which a validation process has been performed ensuring reliability of data within the first snapshot, and the second snapshot is an unvalidated snapshot for which the validation process has not been performed;

accessing an operation log of operations performed by the commerce platform system during a time period between when the first snapshot was generated and when the second snapshot was generated, the operation log including data to recreate each event of the one or more events processed by the commerce platform system during the time period between when the first snapshot was generated and when the second snapshot was generated;

transforming first one or more search indexes and first transformed data from first search system data from the first snapshot by ingestion of the operations in the operation log at the search system and updating the first one or more search indexes and the first transformed data from the first search system data with the ingested operations in the operation log to generate a validated second search system data in a validated second snapshot;

determining a reliability of second search system data within the second snapshot by comparing the second search system data from the second snapshot with the validated second search system data from the validated second snapshot; and in response to determining that the reliability does not indicate a match between the second search system data from the second snapshot and the validated second search system data from the validated second snapshot:
    updating a data quality status of the second search system data from the second snapshot indicating that a data quality of the second search system data from the second snapshot is not validated up to a time when the second snapshot was generated;
    tracing an inconsistent search system data entry in the second search system data from the second snapshot based on a first data identifier of a mismatched search system data entry found during comparison of the inconsistent search system data entry in the second snapshot with a corresponding validated search system data entry from the validated second snapshot having a second data identifier, the second data identifier being identical to the first data identifier, wherein the first data identifier and the second data identifier are used within the search system;
    requesting a correction of the mismatched search system data entry in the search system data that corresponds to the inconsistent search system data entry in the second search system data;
    updating and re-indexing the mismatched search system data entry in the second search system data by replacing the mismatched search system data entry with the validated search system data entry;
    in response to updating and re-indexing the mismatched search system data entry, updating the data quality status of the second search system data from the second snapshot indicating that the data quality of the second search system data from the second snapshot is validated up to the time when the second snapshot was generated; and
    limiting a search result up to the time when the second snapshot was generated based on the updated validated data quality.

11. The non-transitory computer readable storage medium of claim 10, further comprising:
    in response to that the determined reliability indicates a match between the second search system data from the second snapshot and the validated second search system data from the validated second snapshot, validating the data quality status of the second search system data based on the determination of the reliability of the second search system data.

12. The non-transitory computer readable storage medium of claim 10, further comprising:
    updating the inconsistent search system data entry in the second search system data from the second snapshot having the data identifier with a corresponding validated second search system data entry from the validated second snapshot having the same data identifier.

13. The non-transitory computer readable storage medium of claim 12, further comprising:
    transforming the second snapshot to a validated data quality status by tracing and updating each of one or more inconsistent search system data entries found during comparison of the second search system data entries in the second snapshot with corresponding validated second search system data entries from the validated second snapshot.

14. The non-transitory computer readable storage medium of claim 10, wherein the first snapshot generated by the commerce platform system at a first time and the second snapshot generate by the commerce platform system at the second time after the first time.

15. The non-transitory computer readable storage medium of claim 10, wherein the search system data is generated by: ingesting original data generated by the commerce platform system, generating a search index from the original data, and storing a transformed version of the ingested data in a format searchable using the search index.

16. The non-transitory computer readable storage medium of claim 10, wherein the search system data generated by the commerce platform system comprises data generated from data associated with one or more events performed by the commerce platform system on behalf of one or more merchant systems.

17. A commerce platform system for verifying integrity of search system data, comprising:
    a memory; and
    a processor coupled with the memory configured to:
        access, at a search system, a first snapshot and a second snapshot of the search system data, wherein the search system data in each snapshot comprises one or more search indexes and transformed transaction data searchable by the one or more search indexes, and the search system data is generated for each snapshot from data ingested by the search system in response to transactions one or more events performed by the commerce platform system, wherein the first snapshot is a validated snapshot for which a validation process has been performed ensuring reliability of data within the first snapshot, and the second snapshot is an unvalidated snapshot for which the validation process has not been performed,
        access, at a processing system, an operation log of operations performed by the commerce platform system during a time period between when the first snapshot was generated and when the second snapshot was generated, the operation log including data to recreate each event of the one or more events processed by the commerce platform system during the time period between when the first snapshot was generated and when the second snapshot was generated,
        transform first one or more search indexes and first transformed data from first search system data from the first snapshot by ingestion of the operations in the operation log at the search system and update the first one or more search indexes and the first transformed data from the first search system data with the ingested operations in the operation log to generate a validated second search system data in a validated second snapshot,
        determine a reliability of second search system data within the second snapshot at a second time period by comparing the second search system data from the second snapshot with the validated second search system data from the validated second snapshot, and
        in response to determining that the reliability does not indicate a match between the second search system data from the second snapshot and the validated second search system data from the validated second snapshot:
            update a data quality status of the second search system data from the second snapshot indicating that a data quality of the second search system data from the second snapshot is not validated up to a time when the second snapshot was generated,
            trace an inconsistent search system data entry in the second search system data from the second snapshot based on a first data identifier of a mismatched search system data entry found during comparison of the inconsistent search system data entry in the second snapshot with a corresponding validated search system data entry from the validated second snapshot having a second data identifier, the second identifier being identical to the first data identifier, wherein the first data identifier and the second data identifier are used within the search system, request a correction of the mismatched search system data entry in the search system data that corresponds to the inconsistent search system data entry in the second search system data;

update and re-index the mismatched search system data entry in the second search system data by replacing the mismatched search system data entry with the validated search system data entry;

in response to updating and re-indexing the mismatched search system data entry, update the data quality status of the second search system data from the second snapshot indicating that the data quality of the second search system data from the second snapshot is validated up to the time when the second snapshot was generated; and limit a search result up to the time when the second snapshot was generated based on the updated validated data quality.

18. The commerce platform system of claim 17, wherein the processor is further configured to:

in response to that the determined reliability indicates a match between the second search system data from the second snapshot and the validated second search system data from the validated second snapshot, validate the data quality status of the second search system data based on the determination of the reliability of the second search system data.

19. The commerce platform system of claim 17, wherein the processor is further configured to:

update the inconsistent search system data entry in the second search system data from the second snapshot having the data identifier with a corresponding validated second search system data entry from the validated second snapshot having the same data identifier.

* * * * *